United States Patent [19]
Thorsbakken

[11] 3,766,610

[45] Oct. 23, 1973

[54] WEDGE LOCKING DEVICE

[76] Inventor: Arden L. Thorsbakken, 106 S. Main St., River Falls, Wis. 54022

[22] Filed: June 29, 1971

[21] Appl. No.: 158,000

[52] U.S. Cl..................24/115 R, 24/136, 403/211
[51] Int. Cl. ............................................. F16g 11/00
[58] Field of Search ..................... 24/126 K, 136 K, 24/30.5 L, 16 PB

[56] References Cited
UNITED STATES PATENTS

| | | | |
|---|---|---|---|
| 3,133,463 | 5/1964 | Davis | 32/63 UX |
| 2,214,961 | 9/1940 | Hawley | 24/126 K |
| 460,859 | 10/1891 | Gardner | 24/126 K |
| 1,728,125 | 9/1929 | Jamison et al. | 24/136 R |
| 1,730,619 | 10/1929 | Mitchell | 24/263 CA |
| 2,784,624 | 3/1957 | Plachecki | 24/263 CA |
| 3,542,321 | 11/1970 | Kahabka | 24/164 PB |
| 3,300,825 | 1/1967 | Andreasen | 24/196 X |

FOREIGN PATENTS OR APPLICATIONS

| | | | |
|---|---|---|---|
| 1,123,842 | 9/1956 | France | 32/63 |
| 1,313,891 | 12/1963 | France | 32/63 |
| 406,126 | 10/1943 | Italy | 32/63 |
| 15,523 | 1884 | Great Britain | 24/126 L |
| 652,546 | 4/1951 | Great Britain | 24/263 CA |
| 306,577 | 3/1932 | Germany | 24/136 K |

Primary Examiner—Paul R. Gilliam
Attorney—Ralph L. Dugger et al.

[57] ABSTRACT

A locking device for locking lines including bands, cables, ropes or the like utilizing a wedge lock principle. The device is made so that once the line to be locked into position is placed in the locking device, the locking member or key cannot be removed. This makes the device suitable for locking all sorts of lines or flexible elongated members because the locking member will not be lost.

7 Claims, 9 Drawing Figures

INVENTOR.
ARDEN L. THORSBAKKEN
BY
Dugger Peterson Johnson & Westman
ATTORNEYS

INVENTOR.
ARDEN L. THORSBAKKEN

WEDGE DOCKING DEVICE

BACKGROUND OF THE INVENTION

1. Field of the Invention

The present invention relates to locking devices using locking members.

2. Prior Art

Various locking members using wedge principles are in the prior art. For example, U.S. Pat. No. 166,022 shows a clothes pin using a wedge lock principle for locking onto a clothes line, but is not of the type which will secure a line into a loop. In addition, U.S. Pat. No. 1,073,720 shows a wedge lock metallic rope fitting that uses a removable wedge or key, but the wedge will always be able to be removed easily when the lock is loosened, so that the wedge member could be lost.

Other wedge lock devices are shown in U.S. Pat. No. 2,385,225 which is a cable clamp using a wedge to hold the cable in place on the clamp, and U.S. Pat. No. 2,173,698 which is a tie clamp for use in building construction.

The use of wedges on a dental matrix is shown in U.S. Pat. No. 351,065.

SUMMARY OF THE INVENTION

The present invention relates to a universal wedge type clamp for lines or the like. The wedge clamp member embodys two components as shown, namely an outer body, and a wedge lock member positioned through an opening defined in the outer body. The body and the lock member are so formed as to prevent the lock member from falling out of the body once the line to be held in position is placed through the body adjacent the lock member. Further, the wedge lock member is made so that it will remain in an open or unlocked position so that the line to be held can easily be adjusted.

The device is used with two lengths of line or flexible band passing through it, and this can be either from a single line formed into a loop, or from two separate lines being held together and passing through the clamp.

The device is very simple to make and can be molded from suitable plastic material or made out of metal if desired and is very easy to use.

Variations of the invention include levers for releasing the wedge key once it has been locked into place, and also means for holding one end of the line to be attached independently of the clamp member itself.

The unit can be used for tieing any devices, such as lines used for securing items, neck ties, shoe strings, tent ropes, and many uses for holding dental equipment in a patient's mouth. Other uses are set forth hereinafter.

DESCRIPTION OF THE PREFERRED EMBODIMENT

Figure 1:
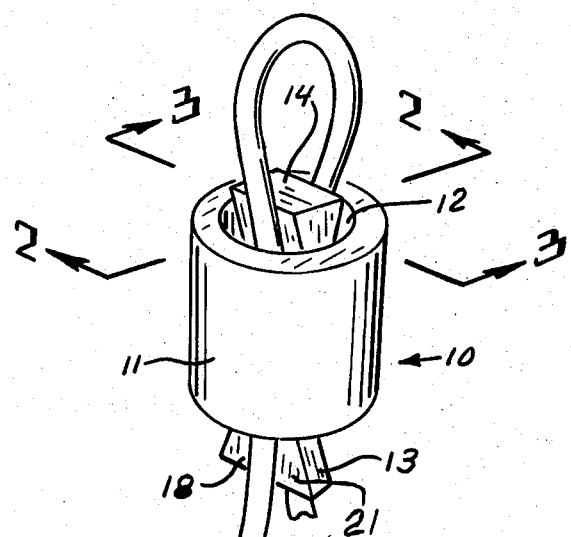
FIG. 1 is a perspective view of a clamp made according to the present invention.
Figure 2:
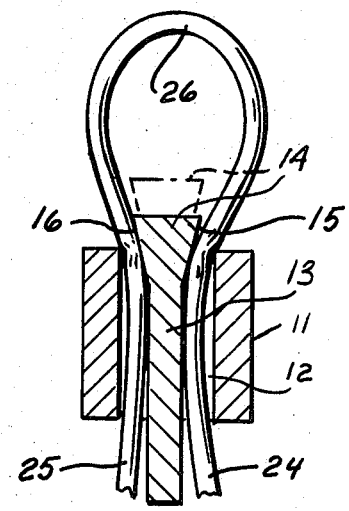
FIG. 2 is a sectional view taken as on line 2—2 of FIG. 1.
Figure 3:
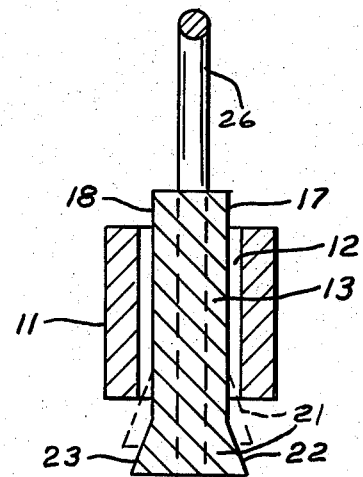
FIG. 3 is a sectional view taken as on line 3—3 of FIG. 1.

The clamping device illustrated generally at 10 comprises an outer housing 11 that can have any desired outer cross sectional shape, and which has an interior opening 12 therethrough (the housing is tubular). The opening 12 receives a wedge type lock member 13. The opening 12 as shown is cylindrical, but can be of any desired cross section that will accomplish the purposes of the invention. The lock member 13 is specially constructed so that it has a wedge locking end 14 which has two surfaces 15 and 16, diverging toward the end of the locking member as shown in FIG. 2, and has parallel surfaces 17 and 18 as shown in FIG. 3 at right angles to the diverging surfaces. The opposite end of member 13, which is used for locking the member 13 in open position and is indicated at 21, has outwardly tapering surfaces 22 and 23, respectively that join the surfaces 17 and 18. The end portion 21 is made too large to pass through opening or passageway 12.

As shown in FIG. 3, the locking member 13 is longer than the length of housing 11 and can be pulled outwardly from the housing 11 in direction toward the end 21. It can be seen by examining FIG. 2 that the outwardly tapering surfaces 15 and 16 will not engage the wall defining the opening 12, when no line is in place inside the opening 12 and the parallel surfaces 17 and 18 as shown pass through the opening 12 as well. Lock member 13 can therefore be removed from the housing 11 with no line in place in the housing. However, when the clamping device is to be used, two lengths of line 24 and 25, which as shown can be formed into a loop 26, or can be straight lengths of two separate lines, are inserted into the housing 11. The lock member 13 is positioned in the housing with the line on opposite sides thereof as shown and the lock member 13 can no longer be removed from the housing 11. When the lock member 13 is moved to solid line position in FIG. 2, the surfaces 15 and 16 will positively clamp the lengths 24 and 25 against the edges of the housing defining the opening 12 to hold the lock member 13 friction clamped in place to tightly hold the lines 24 and 25. This means that the lock member 13 cannot be moved out of the housing in direction toward its end 21 without tightening down on the lines 24 and 25. The surfaces 22 and 23 keep the lock member from passing through opening 12 in opposite direction.

Thus the lock member 13 will be held within body 11 once the line or other element to be retained is in place in the housing. This is true even when the lock member 13 is moved to its unlocked position.

The lock member 13 is longer than the body 11 and both end portions protrude beyond the ends of the body.

When the lock member 13 is in its open or unlocked position as shown in dotted lines in FIG. 2 for example, the wedge surfaces 15 and 16 are spaced from the edges of opening 12 so that line lengths 24 and 25 can easily be slid past the lock member 13 and adjusted so that the loop 26 can be changed in size. When the lock member 13 is again released and tightened the surfaces 15 and 16 will engage the edges of opening 12 and squeeze the rope or line into position as shown in FIG. 2 and positively lock the loop at a fixed length.

Figure 4:
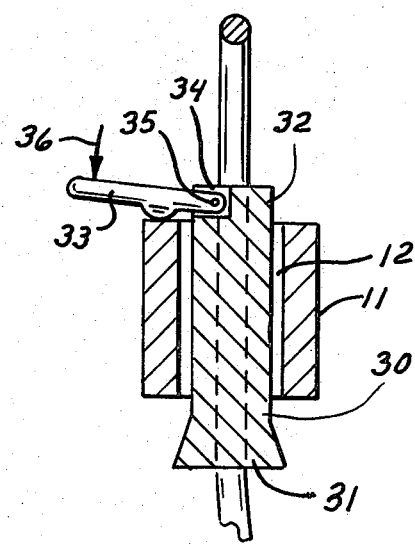
FIG. 4 is a sectional view showing a modified form of the present invention.
Figure 5:
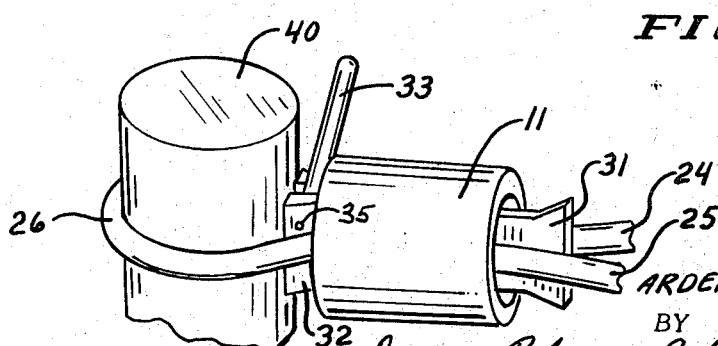
FIG. 5 is a perspective view showing the clamping device of FIG. 4 installed to secure a line onto a support member.

In FIG. 4 a modified form of the present invention is shown. The same housing 11 is utilized, having an opening 12, but a different key or locking member 30 is used in this device. The same structure is shown in FIG. 5 as well. The locking member 30 includes the parallel surfaces, and the head end portion 31 corresponding to the portion 21. The diverging surfaces corresponding to surfaces 15 and 16 are provided at the large or wedge end portion 32. A small lever 33 is pivotally mounted in a slot 34 with a pin 35 extending through the end portion 32. The pin 35 is positioned so that the lever 33 will be movable to position as shown in FIG. 4 against the end edge surface of the body 11, and when the lever 33 is moved with a force in direction as indicated by the arrow 36, the lever 33 will tend to unlock the key 30 by moving it in opposite direction from that indicated by the arrow and moving the tapered wedge locking surfaces on end portion 32 away from the body 11. This permits the release of the lock member 30 even if high wedge locking forces are present between the body 11 and the wedging surfaces.

One manner of use of this type of device is shown in FIG. 5. A structure 40, such as a post or pin or some other device to which a line is to be locked is shown. The loop 26 is looped over this post 40 and the lengths of line pass through opening 12 on opposite sides of the lock member 30. The lock member 30 can be initially locked in open position with the end portion 31 wedged against the body 11 to hold the lock member open so that the line lengths 24 and 25 can slip through easily. Then, as the line is tightened down, the post 40 would strike the outer end surface of the end portion 32, which as shown has the outer outwardly wedging surfaces and also carries the lever 33, back toward the body 11. This will tend to wedge the lock member 30 against the body 11 and tightly clamp the line lengths. By pulling on the line lengths to keep them tight until the post 40 strikes the end of the lock member 30, as the lock member 30 is tightened, the entire assembly will be tightly held on the post 40. The body 11 can be jammed tightly up against the tapered surfaces of the locking end 32, and the lever 33 will always insure that the unit can be released by actuating the lever to force the body 11 away from the wedge surfaces and release the lock member 30. When the lock member 30 is forced against the post 40 as shown the device will be securely held, with a high degree of wedge lock force, and will not come loose during pull on either of the lengths 24 and 25. The line will be securely fastened.

Figure 6:
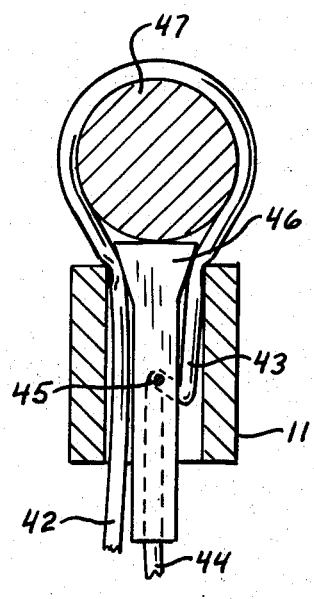
FIG. 6 is a perspective view of a modified form of the invention showing a clamp for tightening one length of a line or cable being secured.

A further modified form of the present invention is shown in FIG. 6. In this particular form of the invention, the clamp unit is used with a lever member that can be utilized for tightening the cable or line with which the locking device is used. For example, referring to FIG. 6, the body 11 is shown with a cable or line 42 installed therein. The line has an end portion 43 which is attached in a suitable manner to a lever 44 that is pivotally mounted with a pin 45 to a lock member 46. The lock is shaped as previously shown, and fits inside the interior portion of the body member 11 and when the line or cable 42 is looped around a post 47, the line and lock member can be drawn tight so that the lock member 46 will tighten against the interior edges of the opening 12. The lever 44 will tighten the cable tightly against the post 47, and then by insuring that the body 11 is tightly wedged against the wedging surfaces, the unit will be very securely held.

Figure 7:
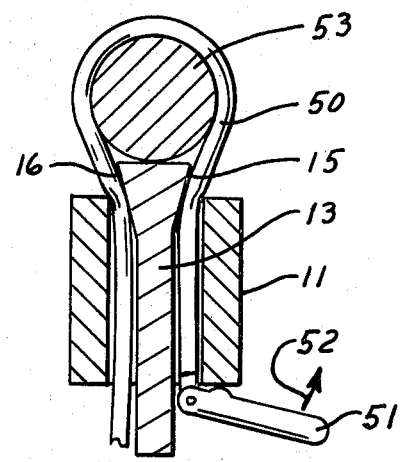
FIG. 7 is a sectional view of a further modified form of the invention.

In FIG. 7, a slightly modified form of the device of FIG. 6 is shown. In this particular instance, the key lock 13 is used just as before, but the line or cable 50 has a lever member at its outer end indicated at 51. The lever 51 at the end of line 50 can be pivotally mounted, or if the line 50 is flexible the lever member can merely be attached to the line. The line will bend for pivoting of the lever.

The clamp unit can be placed into position as shown, with the lever 51 protruding from the outer end of the body 11. The lock member 13 will be released and line 50 drawn tight. Then the lever 51 can be moved in direction as indicated by the arrow 52 to pull the line tight onto the post 53 and also wedge the body 11 tightly against the wedging surfaces 15 and 16, to insure that the lock member 13 will be tightly held. The force on the line 50 will pull the unit tightly against the post 53. This will give a very tight clamping, and insure that the cable will be secure.

Figure 8:
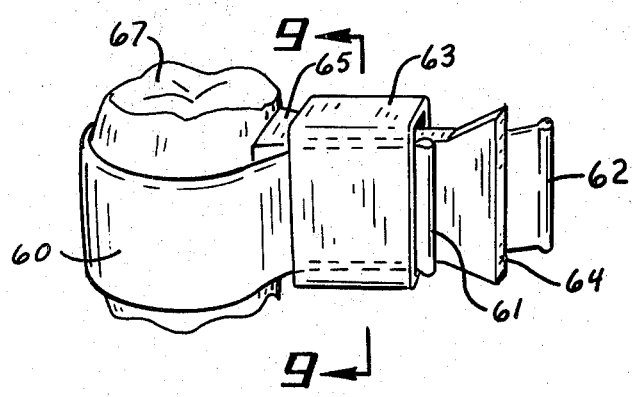
FIG. 8 is a perspective view of a matrix retainer for teeth utilizing the clamping device made according to the present invention.
Figure 9:
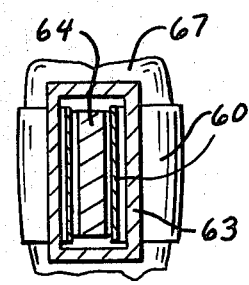
FIG. 9 is a sectional view taken as on line 9—9 in FIG. 8.

FIGS. 8 and 9 show a clamping unit of the present invention holding a dental matrix retainer for a tooth. The matrix retainer in this particular case comprises a flexible band 60 made of a tough plastic such as vinyl or the like, and having a bead or roll at each end. The bead 61 is at a first end, and the bead 62 is at a second end (only one bead can be used if desired, for example bead 61). A housing 63 for the wedge clamp member is made as shown in rectangular cross section, and a lock member 64 is also inserted into the housing. The lock member has a wedging locking end 65, and an open end locking end 66. The lock member 64 can be removed from the housing with the band out of place, as previously explained, in connection with the other forms of the invention, but when the band 60 is in place, the wedge lock member cannot be removed. The beads 61 and 62 are made so that they can be slipped into the housing 63 one at a time by moving the lock member 64 first to one side of the opening and then to the other.

The flexible band 60 is made so that the bead 61 can be pulled down against the outer edge of the housing 63 as the band is wrapped around a tooth 67. The tooth 67 is one that has to be filled, and usually the cavity would be on the side of the tooth opposite from the lock member 64.

The free end bead 62 is then pulled to tighten the band down around the tooth, so that the bead 61 engages the body member 63, and with the lock member 64 loose, the band is tightened as much as possible. When the end of lock member 64 which comprises the wedge end 65 engages the tooth and starts to wedge into the housing 63. As the band 62 is continued to be pulled tight to fit tightly against the tooth, the tooth will engage the lock member 64 into lock position with respect to the housing 63. The band 60 will then be held tightly. This makes a convenient and quick installation of a matrix retainer that will stay in position while the tooth is being filled. The unit of course is relatively small, but accomplishes the purposes set forth very conveniently. The lock member 64 does not fall out of the housing 63 when the band 60 is in place, and will securely hold the unit for filling teeth.

Thus in all forms of the invention, as shown, the wedge lock member is made so that it will not come out of the housing when the band or line it is holding in place is in the housing and engaging the lock member.

The unit has a large number of uses, and can be used for electrical connectors fastening wires to battery posts, for typing shoes especially for small children, for holding lines to posts for example in boot mooring, or for tent rope locks, and can even be used for holding retaining rods for concrete work or forms. Other uses include pouch or bag drawstring locks, strap clamps for shipping boxes or orthodontic band locks.

The uses of the clamp of course are limited only by the imagination of the user, and the fact that the key will not be lost makes the clamp reusable and always available when needed.

The lock member outer surface and also the surface defining the opening 12 can have serrations or grooves which aid in supplying holding power for the lock member, if desired.

The housing can be made into any desired cross sectional shape as long as the lock member will lock open with one set of surfaces and lock onto a properly placed line or board with a set of wedge locking surfaces. The two sets of surfaces are positioned to act along planes at 90° to each other. The end portion which is used to lock the line in place is small enough to pass through the opening in the body 11 but can't back out when the line is in place, and the end used to lock the lock member open is larger than the opening in the body so that it won't pass through the body.

The term line is used in its broadest sense to mean a rope, cable, plastic band and any element to be held.

While the drawings illustrate two lengths of line or band being held the lock also can be used to hold one length as well. The line would be on one side of the wedge end only if used singly.

What is claimed is:

1. A clamping assembly for a line or the like, said clamping assembly comprising an outer housing member having an opening therethrough defined by surface portions, a lock member in said opening, said lock member having a wedge end and an opposite end, said opposite end being of larger size than said opening to block passage thereof through said opening, and said wedge end being of size so that it will pass through said opening in a first direction, said lock member being movable to a first position into said opening in said first direction a distance sufficient to permit a line to be held to pass through said opening and past the wedge end with the lock member in said opening before said opposite end stops movement of said lock member in said first direction, and said line being of size to be wedged against a first surface portion by said wedge end when said wedge end is moved in a second opposite direction with said line in place extending through the opening between said first surface portion and said wedge end.

2. The combination as specified in claim 1 wherein said opposite end is of size to engage surface portions defining the opening in said housing member at one end of said housing and to lock said lock member in said first position.

3. The combination as specified in claim 1 and lever means carried by said lock member and engagable with said housing to force said housing and the wedge end of said lock member apart when said wedge end is wedged against said line.

4. The combination as specified in claim 1 and lever means attached to said line, said lever means having means for applying a reaction force against one member of said clamping assembly, whereby said line can be tightened under lever action.

5. The combination as specified in claim 4 wherein said lever means is positioned to react against said housing member and force the housing toward the wedge end.

6. The combination as specified in claim 1 wherein said line comprises a flexible band having a width to permit use as a dental matrix retainer, said band being formed into a loop formed of two band lengths, both of said lengths passing through said opening.

7. The combination as specified in claim 1 wherein said line has two separate lengths, said housing opening and lock member being of size when the lock member is moved in the first direction to permit two lengths of line, to pass through the opening on opposite sides of the lock member, and the lock member wedge end locking both lengths of line relative to the housing when the lock member moves in the second opposite direction.

* * * * *